Figure 1:
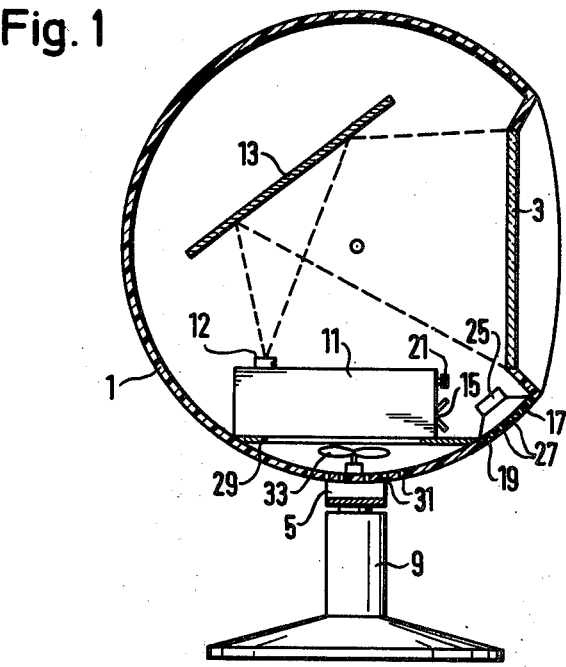

United States Patent [19]
Steiner

[11] 3,985,430
[45] Oct. 12, 1976

[54] IMAGE VIEWING APPARATUS

[75] Inventor: Siegfried Steiner, Munich, Germany

[73] Assignee: Steiner-Film Inh. Siegfried Steiner, Munich, Germany

[22] Filed: May 15, 1975

[21] Appl. No.: 577,756

[30] Foreign Application Priority Data
May 24, 1974  Germany.................. 7418l105[U]

[52] U.S. Cl.................................. 353/61; 352/72; 352/242; 353/77; 353/119
[51] Int. Cl.².................. G03B 23/02; G03B 21/16; G03B 21/28
[58] Field of Search ................... 353/57, 61, 76, 77, 353/119, 74; 352/72, 242

[56] References Cited
UNITED STATES PATENTS

| | | | |
|---|---|---|---|
| 2,592,444 | 4/1952 | Matelena | 353/74 |
| 3,472,588 | 10/1969 | Dine et al. | 353/76 |
| 3,586,432 | 6/1971 | Pentes | 353/74 |
| 3,848,980 | 11/1974 | Plummer | 353/77 |

Primary Examiner—Richard E. Aegerter
Assistant Examiner—Steven L. Stephan
Attorney, Agent, or Firm—Hans Berman

[57] ABSTRACT

A spherical shell mounted on a base for pivoting movement about a diameter has a first aperture in which a frosted groundglass screen is mounted parallel to the pivot axis. Images are sequentially projected on the screen from the vertically upright beam of a cassette-type sound projector by a deflecting mirror. Cassettes are inserted in and withdrawn from the projector through a second aperture subjacent the first aperture. The perforated cover normally closing the second aperture carries the loudspeaker of the sound system. Cooling air is blown on the projector lamp from bottom openings of the shell by a fan arranged between the shell and a bracket on which the projector rests.

9 Claims, 2 Drawing Figures

U.S. Patent  Oct. 12, 1976  3,985,430

IMAGE VIEWING APPARATUS

This invention relates to viewing apparatus, and particularly to apparatus in which the images to be viewed are projected on a translucent screen closing an aperture in a housing by a projector installed in the housing cavity.

Viewing apparatus of the type described is employed widely as an audio-visual teaching tool, for advertising purposes, and the like. It is a common shortcoming of the known viewing devices of the type described that they are bulky when permitting ready access to their operating elements for changing the image carrier, and do not permit rapid and convenient change of the program to be viewed when of small size.

It is a primary object of this invention to provide a viewing apparatus which automatically presents a sequence of images, moving or still, and permits convenient replacement of the image source when it is desired to change the program to be presented, yet is as small as possible in view of the available focal length of the projection lens.

With this object and others in view, as will presently become apparent, the invention provides image viewing apparatus in which a shell encloses a cavity and is formed with a first aperture and a second aperture. A translucent screen closes the first aperture. A cassette-loading projector in the cavity of the shell includes an optical system for projecting an image from a cassette in the projector on the surface of the screen in the cavity. The projector is formed with a loading port for insertion and removal of the cassette in a certain direction. The second aperture of the shell is aligned with the port in this direction.

Figure 2:
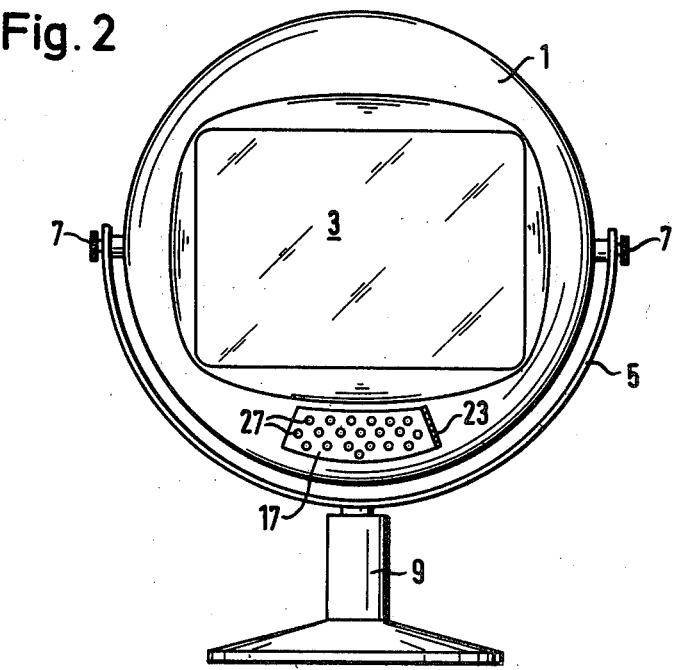

Other features, additional objects, and many of the attendant advantages of this invention will readily become apparent from the following description of the preferred embodiment when considered in connection with the appended drawing in which:

FIG. 1 shows viewing apparatus of the invention in side-elevational section; and FIG. 2 illustrates the apparatus of FIG. 1 in front elevation.

Referring now to the drawing in detail, there is seen a soundfilm viewing and listening apparatus of the invention whose operating elements are enclosed in a generally spherical shell 1 of glassfiber-reinforced, opaque plastic. The generally upright front face of the shell 1 has an aperture in which a projection screen 3 of translucent, frosted, ground glass is recessed in a normally vertical position. The shell is mounted on a bracket 5 which is a semi-circular metal strap. Trunnions on the shell 1 are pivotally mounted on the ends of the bracket 5 by means of screws 7 having knurled heads so that the angular position of the shell 1 may be secured without tools by tightening the screws. The bracket 5 is mounted on a stand or base 9 for angular movement about a vertical axis which intersects the pivot axis through the screws 7 at right angles in the center of the shell 1.

The screen 3 is normally held parallel to both aforementioned axes by the weight of a projector 11 mounted below the pivot axis through the screws 7 even when the screws are loose. The projector is of the basically known cassette-loading type. Its objective lens system 12 projects an image-forming beam vertically upward toward a mirror 13 mounted generally above the horizontal median plane of the shell 1 in a position to deflect the beam toward the inner or back surface of the screen 3. The cassette-receiving port 15 of the projector 11 is directed horizontally forward toward a second aperture 19 in the front face of the shell 1. The port 15 and the aperture 19 are aligned in the direction in which a cassette may be slid into or out of the projector 11 generally at right angles to the optical axis of the lens system 12.

The aperture 19 is normally closed by an approximately rectangular cover 17 whose outer surface is flush with that of the shell 1. It gives access to knobs 21 which permit control of the projector 11 and may include the volume control knob of the built-in sound amplifier, a focusing knob, and the like. The cover 17 moves toward and away from the illustrated, aperture-closing position on a hinge 23 which connects a short edge of the cover to the shell 1. The loudspeaker 25 of the sound-system otherwise enclosed in the housing of the projector 11 is mounted on the inner surface of the cover 17 and connected with the amplifier of the projector by flexible cables, conventional and not shown. Perforations 27 in the cover 17 transmit sound outward from the shell 1.

A flat, horizontal grate 29 in the cavity of the shell 1 bounds a segment-shaped chamber in the shell in an upward direction and carries the projector 11. The chamber is downwardly bounded by the spherically curved bottom portion of the shell 1 which is formed with a multiplicity of further apertures 31. A fan 33 mounted in the chamber draws air into the shell through the apertures 31 and blows the air through the grate 29 and through non-illustrated openings in the projector housing toward the projector lamp, not shown and conventional in itself. The heated air can escape through the perforations 27 in the cover 17. The power cable which supplies electric current to the projector for operating its lamp, motor, and amplifier and also feeds the fan 33 has not been shown in order not to crowd the drawing.

While the invention has been described in its application to the viewing of images from soundfilm, it is obviously applicable to the viewing of silent film or of transparencies which may or may not be accompanied by explanatory talk or other audible communications, the respective necessary projectors being staple articles of commerce. The cover 17 will readily be shaped to pass a slide magazine for a slide projector, the terms magazine and cassette being interchangeable for the purpose of this specification. The same opening 19 may permit the separate insertion of a slide magazine and of a cassette of magnetic tape carrying auditory information.

It is desirable to have the aperture 19 closely adjacent the aperture in the shell 1 which is sealed by the screen 3. When the apparatus needs servicing, such as adjustment of knobs 21, the effect of the adjustments on the image shown on the screen 3 is readily observed by a person making the adjustments. Obviously, the sound should come from a source closely adjacent the screen 3. The distance between the screen 3 and the aperture 19 thus should be smaller than the smallest exposed dimension of the screen or of the shell aperture in which it is mounted.

A spherical shell 1 has advantages other than a pleasing appearance over any other shape. As is evident from FIG. 1, the cavity in a spherical shell lends itself to accomodation of the necessary operating elements of the viewing apparatus with a minimum of wasted space, thereby reducing the bulk of the equipment. However, at least some of the advantages of this invention are available from viewing apparatus which does not combine all features shown in the drawing.

It should be understood, therefore, that the foregoing disclosure relates only to a preferred embodiment of the invention and that it is intended to cover all changes and modifications of the example of the invention herein chosen for the purpose of the disclosure which does not constitute departures from the spirit and scope of the invention defined in the appended claims.

What is claimed is:

1. Viewing apparatus comprising:
   a. a shell enclosing a cavity and formed with a first aperture, a second aperture, and at least one third aperture;
   b. a translucent screen closing said first aperture,
      1. said second aperture being spaced from said first aperture a distance smaller than any dimension of said first aperture;
   c. a closure member mounted on said shell for movement toward and away from a position in which said member closes said second aperture,
      1. said closure member being formed with perforations leading outward of said cavity in said position of said member;
   d. an apertured support in said cavity,
      1. said shell having an inner surface portion in said cavity formed with said at least one third aperture,
      2. said inner surface portion and said support defining therebetween a chamber;
   e. a cassette-loading projector mounted on said support,
      1. said projector including an optical system for projecting an image from a cassette in said projector on the surface of said screen in said cavity,
      2. said projector being formed with a loading port for insertion and removal of said cassette in a predetermined direction,
      3. said second aperture being aligned with said port in said direction,
      4. said projector having an apertured surface directed toward said at least one third aperture; and
   f. a fan mounted in said chamber for directing a stream of cooling air from said at least one third aperture toward said surface of said projector.

2. Apparatus as set forth in claim 1, wherein said screen has an exposed viewing surface outside said cavity, said projector being offset from a line perpendicular to said surface at the center of said surface, said optical system including lens means for projecting said image transversely to said line and a mirror operatively interposed between said lens means and said screen in said cavity for deflecting said image to said screen.

3. Apparatus as set forth in claim 1, wherein said second aperture is closer to said first aperture than to said at least one third aperture.

4. Apparatus as set forth in claim 3, further comprising a loudspeaker mounted on said cover, said loudspeaker being received in said cavity in said position of said member.

5. Apparatus as set forth in claim 3, further comprising a base, a bracket mounted on said base and having two end portions, and fastening means pivotally securing said shell to said end portions for angular movement of said shell about an axis intersecting said end portions.

6. Apparatus as set forth in claim 5, wherein said shell is substantially spherical.

7. Apparatus as set forth in claim 5, wherein said screen defines a plane parallel to said axis.

8. Apparatus as set forth in claim 5, wherein said projector is offset from said axis and of sufficient weight to hold said shell in a position in which said projector is located below said axis when said axis is horizontal.

9. Apparatus as set forth in claim 1, wherein said second aperture is spaced from said port in said direction.

* * * * *